United States Patent [19]
Bohen et al.

[11] Patent Number: 4,954,542
[45] Date of Patent: Sep. 4, 1990

[54] TETRAHALOPHTHALATE ESTERS AS FLAME RETARDANTS FOR POLYBUTYLENE TEREPHTHALATE RESINS (PBT)

[75] Inventors: Joseph M. Bohen, King of Prussia; Ronald F. Lovenguth, Doylestown, both of Pa.

[73] Assignee: Pennwalt Corporation, Philadelphia, Pa.

[21] Appl. No.: 173,343

[22] Filed: Mar. 25, 1988

[51] Int. Cl.$^5$ .............................................. C08K 5/12
[52] U.S. Cl. ......................................... 524/89; 524/94; 524/341; 524/371; 524/373; 524/466; 524/219
[58] Field of Search ................... 524/288, 89, 94, 341, 524/371, 373, 466, 219

[56] References Cited

U.S. PATENT DOCUMENTS

| | | | |
|---|---|---|---|
| 2,496,852 | 2/1950 | Bohrer | 260/31.8 |
| 3,751,396 | 8/1973 | Gall | 524/411 |
| 3,772,342 | 11/1973 | Foley | 260/475 R |
| 3,775,165 | 11/1973 | Young et al. | 524/288 |
| 3,947,421 | 3/1976 | Seydl | 524/411 |
| 3,966,676 | 6/1976 | Richter et al. | 260/45.75 B |
| 4,024,102 | 5/1977 | Stackman et al. | 524/288 |
| 4,098,704 | 7/1978 | Sandler | 8/115.6 |
| 4,107,231 | 8/1978 | Wurmb et al. | 524/411 |
| 4,295,886 | 10/1981 | Gresham | 524/288 |
| 4,298,517 | 11/1981 | Sandler | 524/220 |
| 4,361,666 | 11/1982 | Dufour | 524/295 |
| 4,397,977 | 8/1983 | Sandler | 264/120 |
| 4,764,550 | 8/1988 | Lovenguth | 524/217 |

FOREIGN PATENT DOCUMENTS 47-47981 12/1972 Japan .
53-120755 10/1978 Japan .

OTHER PUBLICATIONS

Tabor et al: Fire Retardants: Proceedings of 1974 Intnl. Symposium on Flammability and Fire Retardants—May 1-2, 1974, Ontario Canada—Technomic Pub. Co., pp. 162-179.

*Primary Examiner*—Veronica P. Hoke
*Attorney, Agent, or Firm*—Bernard F. Plantz

[57] ABSTRACT

Tetrahalophthalate esters are disclosed herein as flame retardant processing aids for polybutylene terephthalate (PBT) resins.

18 Claims, No Drawings

TETRAHALOPHTHALATE ESTERS AS FLAME RETARDANTS FOR POLYBUTYLENE TEREPHTHALATE RESINS (PBT)

BACKGROUND OF THE INVENTION

This invention relates to flame retardant compositions containing at least one tetrahalophthalate ester and a polybutylene terephthalate (PBT) resin. Additionally this composition may also contain one or more brominated and/or chlorinated compounds in an amount to provide additional flame retardancy to the PBT resin. This invention also comprehends the method of improving the flame retardancy and melt processability of the polybutylene terephthalate resins by using these tetrahalophthalate esters alone or in combination with one or more bromine and/or chlorine compounds.

Polybutylene terephthalate resins are known in the art as a class of thermoplastics that are characterized by excellent properties such as thermal stability, good resistance to brittleness, low friction and wear, chemical resistance, etc. In general, they are prepared by the polycondensation of terephthalic acid or a diester of terephtahalic acid, such as dimethyl terephthalate (DMT), with 1,4 butanediol. U.S. Pat. Nos. 2,645,319; 3,047,539; 3,953,394; and 4,024,102 describe in detail the preparation of PBT, the teachings of which are incorporated herein by reference.

The PBT Resins are useful in many commercial applications including formation of fibers, film, and molded articles. Other applications include mechanical components, electrical parts, motor parts and the like.

The use of brominated and/or chlorinated compounds by themselves or in combination with other materials such as organic phosphates, antimony compounds, etc. as flame retardants for polybutylene terephthanlate are well known in the art and are exemplified by U.S. Pat. Nos. 3,953.394; 4,024,102; 4,079,034; 4,105,622; 4,165,309; 4,180,496; 4,229,552; 4,284,550; 4,546,126; 4,456,719; 4,525,529; 4,546,139; 4,602,111; and 4,612,344. The teachings of the aforesaid patents are incorporated herein by reference.

Tetrahalophthalate esters have been used as flameproofing materials. For example, U.S. Pat. No. 4,098,704 describes the use of these materials as textile finishing agents. U.S. Pat. Nos. 4,298,517 and 4,397,977 disclose these compounds as flame retardants for halogenated resins.

SUMMARY OF THE INVENTION

The present invention is directed to a composition of a polybutylene terephthalate resin and a flame retardant processing aid comprising:

(i) a polybutylene terephthalate resin having the following repeated structural units:

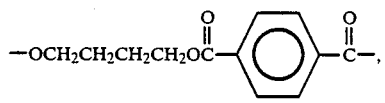

(ii) a flame retarding effective amount of a tetrahalophthalate ester flame retardant processing aid of the formula:

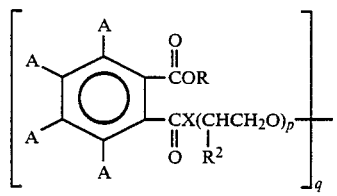

wherein (a) R is selected from the group consisting of hydrogen, an alkyl or substituted alkyl of 1 to 30 carbons, hydroxyalkyl of 2 to 20 carbons, polyhydroxyalkyl of 3 to 10 carbons, and

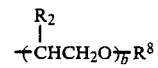

where $R^8$ is an alkyl or substituted alkyl of 1 to 18 carbons, and b is 1 to 50;

(b) $R^1$ is selected from the group consisting of hydrogen, an alkyl or substituted alkyl of 1 to 30 carbons, alkenyl or substituted alkenyl of 2 to 22 carbons,

where $R^7$ is an alkyl of 1 to 18 carbons; a polyhydroxyalkyl of 3 to 12 carbons;

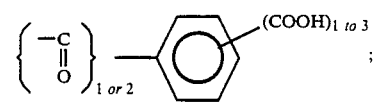

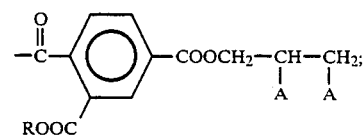

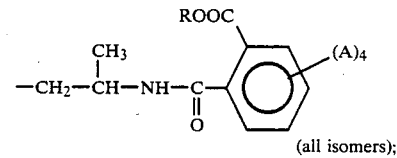

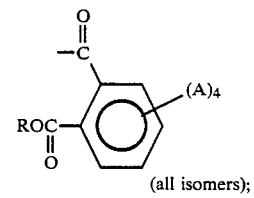

with the proviso that the valence of $R^1$ is equal to q;

(c) $R^2$ is independently selected from the group consisting of H and $CH_3$;

(d) $R^3$, $R^4$, $R_5$, and $R^6$ are independently selected from the group consisting of H and an alkyl of 1 to 18 carbons;
(e) p is an integer of 0 to 50;
(f) q is an integer of 1 to 6;
(g) X is selected from the group consisting of 0 or NH;
(h) A is selected from the group consisting of Cl or Br; and
(i) provided further that when p is zero and X is oxygen that R and $R^1$ are other than a neopentyl group.

Preferably, the weight ratio of (i) to (ii) is within the range of about 100:1 to about 2:1.

It is preferred that in the above tetrahalophthalate ester (ii), R is an alkyl or substituted alkyl of 1 to 10 carbons, A is Br, X is oxygen, p is 0 to 20, and q is 1 to 6. More preferably R is

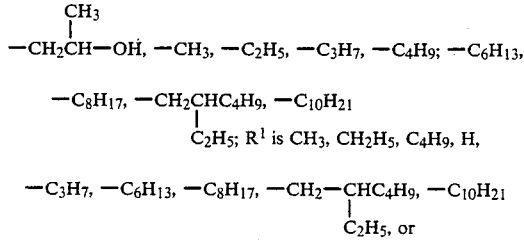

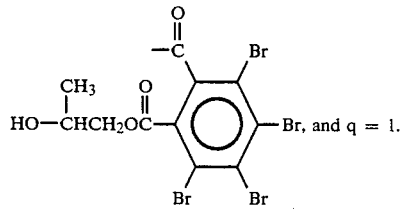

In the tetrahalophthalate ester of ii, preferably p is zero, q is one, and x is oxygen. Even more preferred is when also R and $R^1$ are alkyl groups and A is Br. Most preferably, the ester is di-2-ethylhexyl tetrabromophthalate.

This invention also comprehends the corresponding methods of manufacture of the above compositions.

Another aspect of this invention is that the composition may optionally also contain other bromine and/or chlorine compounds such as those that are well known in the art.

This invention also comprehends the method of improving the flame retardancy and processability of the polybutylene terephthalate resins by incorporating in the resin the tetrahalophthalate compound as described above, alone or in combination with other bromine and/or chlorine flame retardants.

In practicing this invention, the tetrahalophthalate by itself or additionally with other brominated and/or chlorinated flame retardants is added to the polybutylene terephthalate resin in any convenient manner, such as blending or extruding, in order to get a uniform composition. Flame retardant synergists such as antimony oxide ($Sb_2O_3$) may also be added if desired. In addition, other additives such as thermal stabilizers, ultraviolet stabilizers, reinforcing agents, organic polymers, mold release agents, blowing agents, colorants, and the like may also be optionally included. A further advantage of the polyoxyalkylene tetrahalophthalates, alone or in combination with other brominated and/or chlorinated compounds as used in this invention, is their improved compatibility with PBT resins.

Representative tetrahalophthalate compounds usefuls in practicing this invention are as follows (where A is Br or Cl):

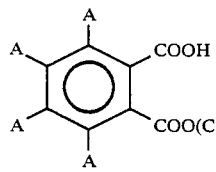 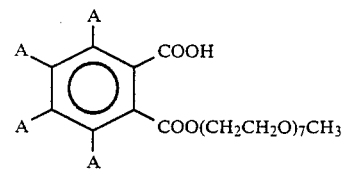

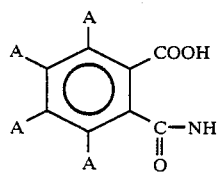 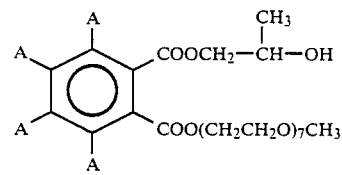

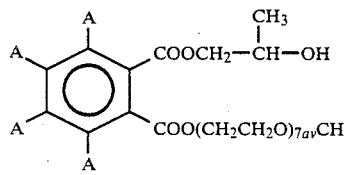 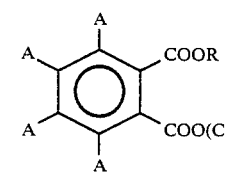 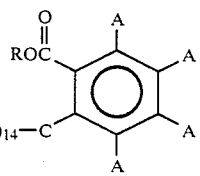

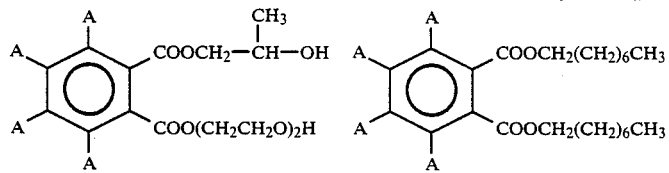
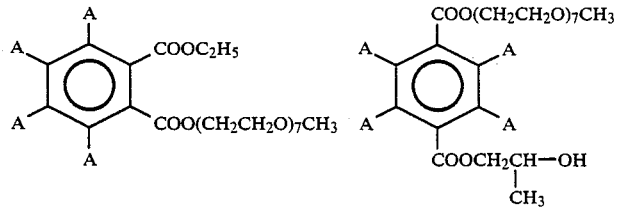
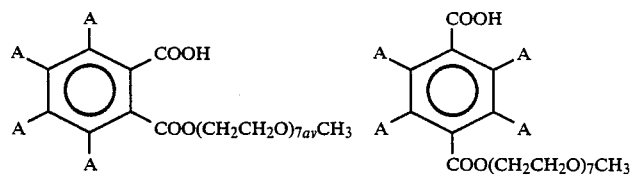
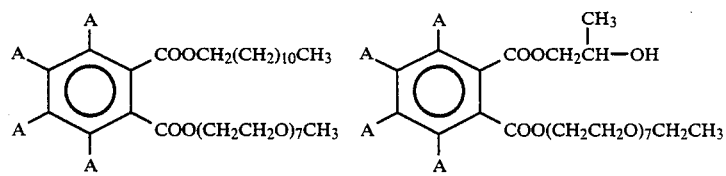
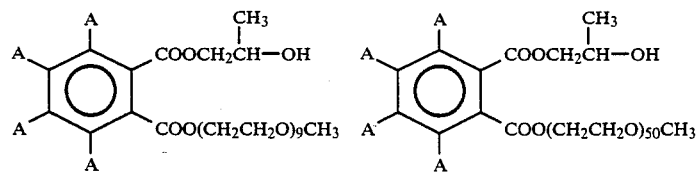
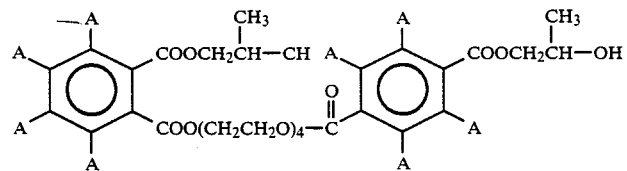
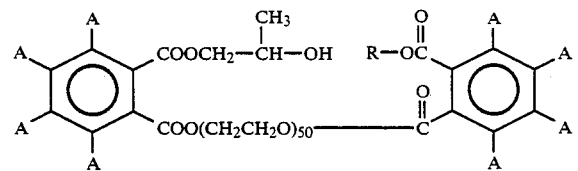
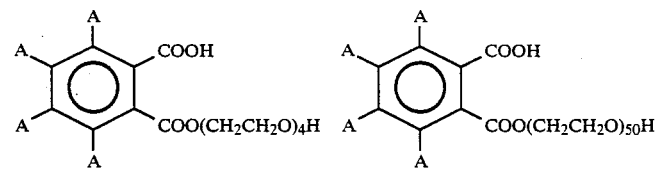
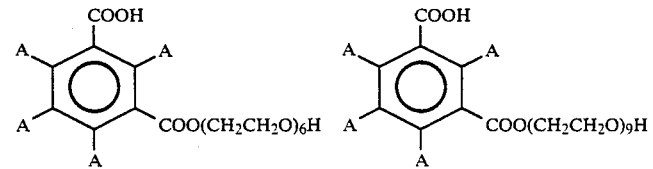

-continued
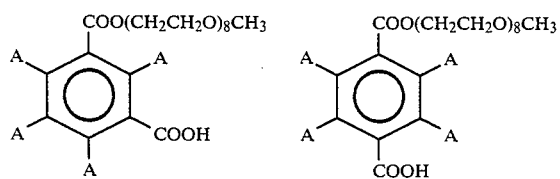
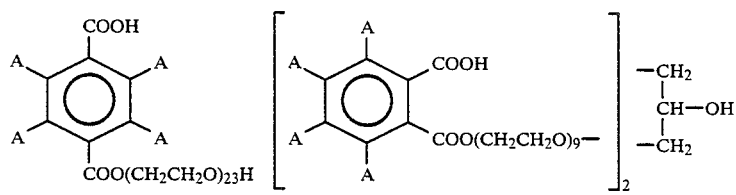
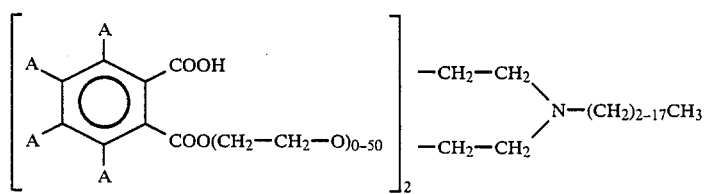
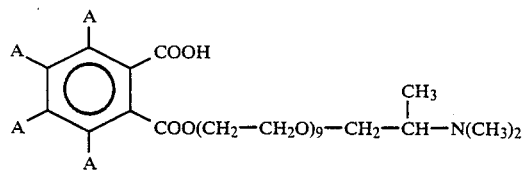
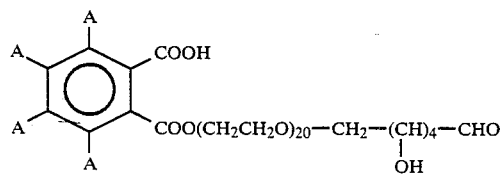
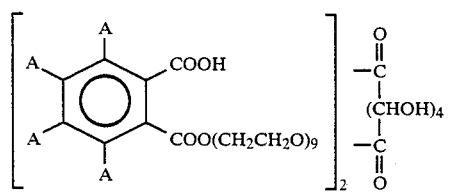
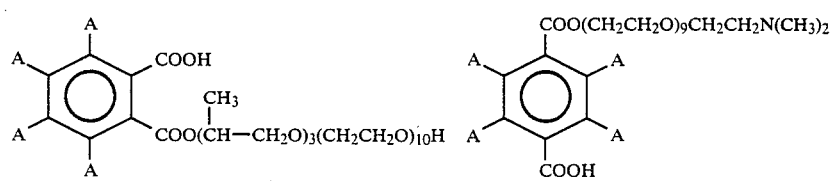
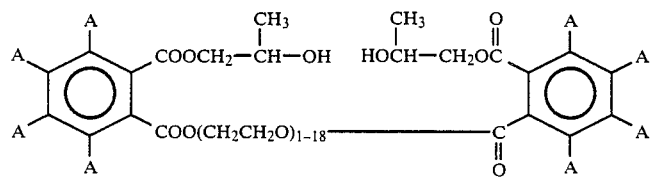

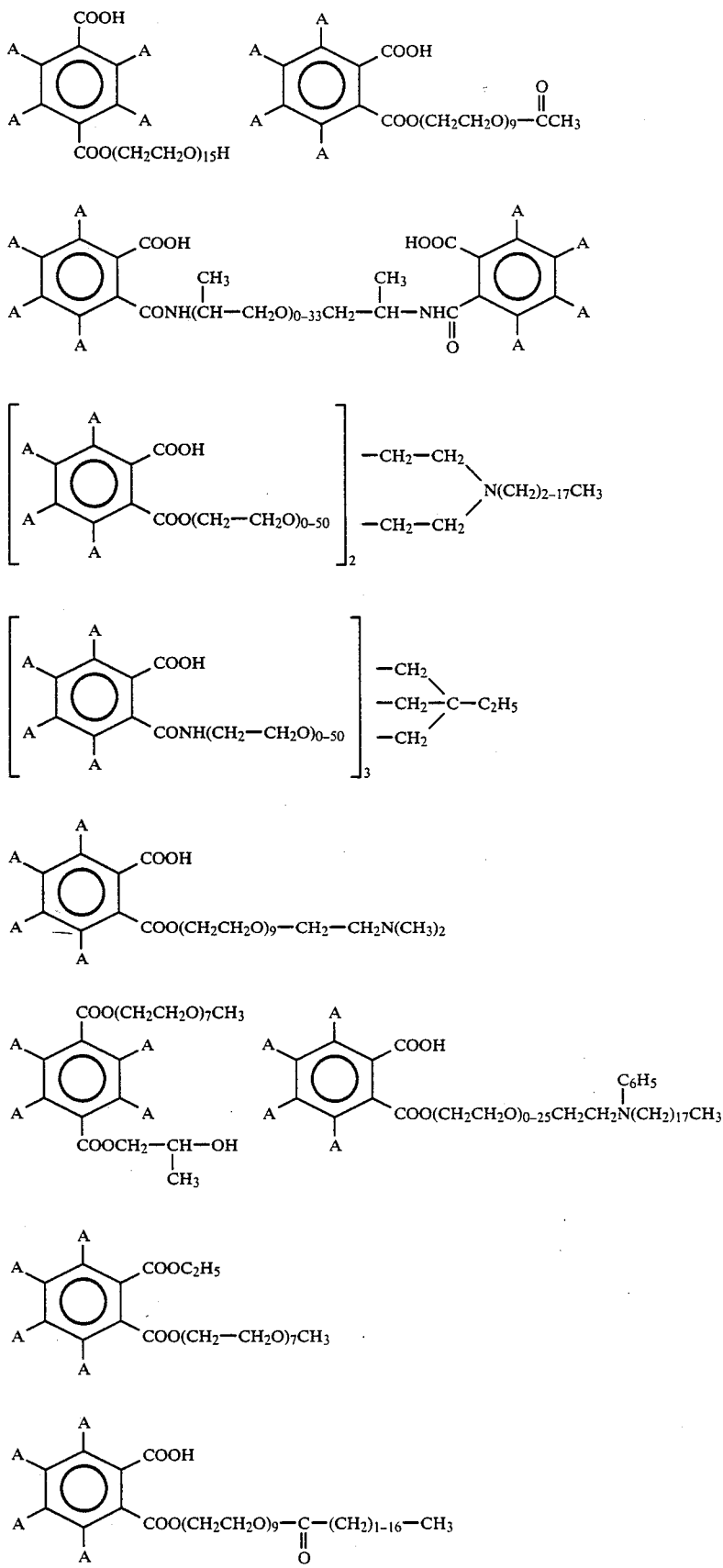

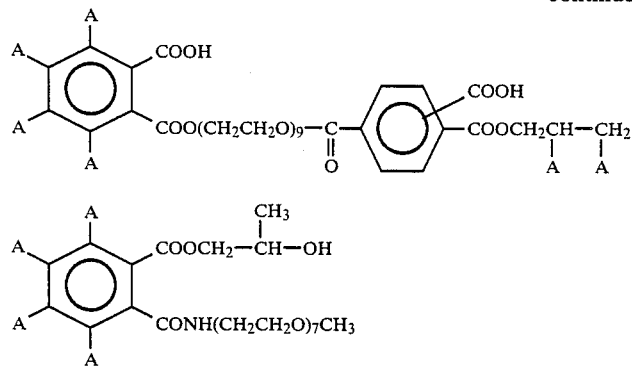
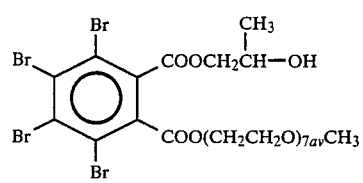
The preferred compounds are:
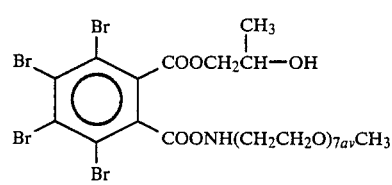
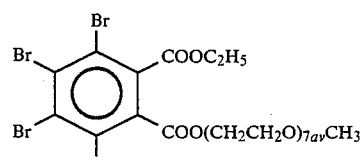
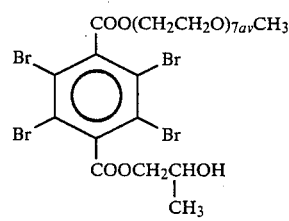
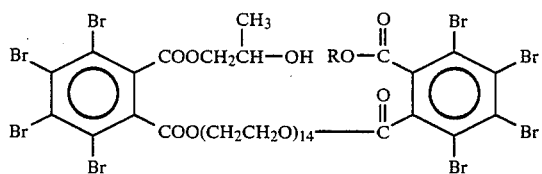
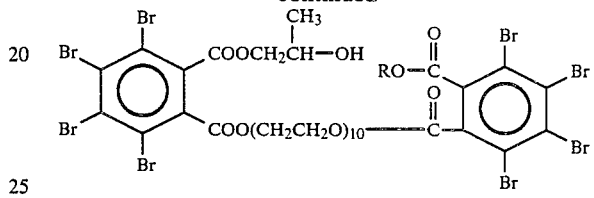
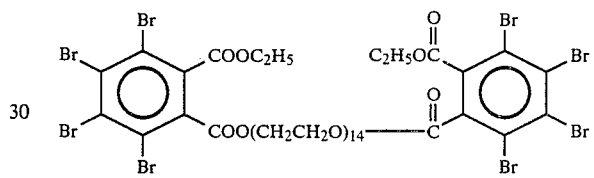
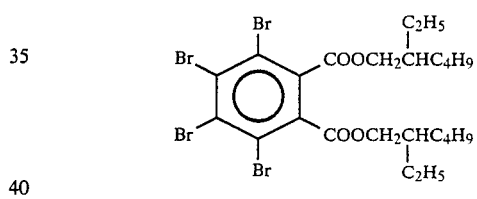
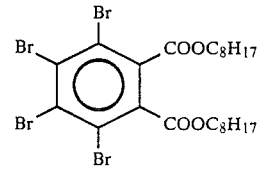
The R in the above formulas is
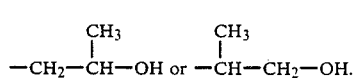
The brominated and/or chlorinated compounds that may be used in combination with the tetrahalophthalates are any of those that are well known in the art. Preferred halogenated flame retardant examples are
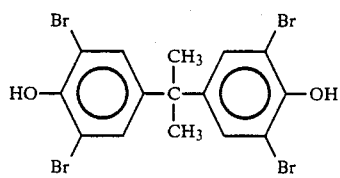

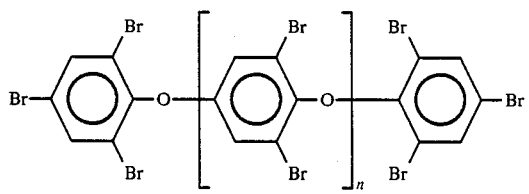
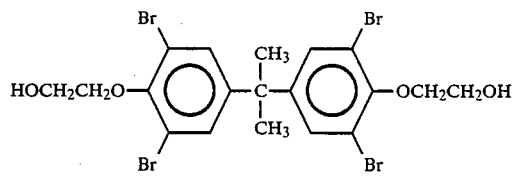
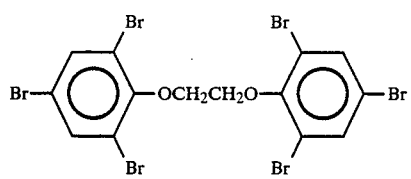
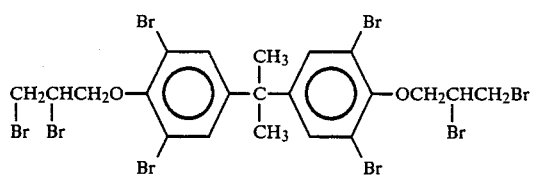
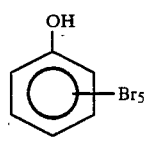
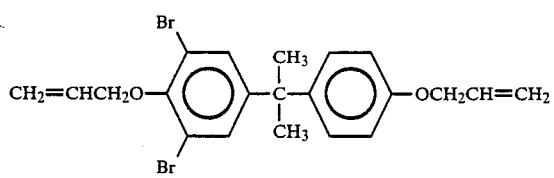
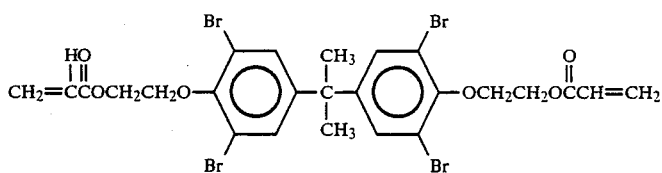
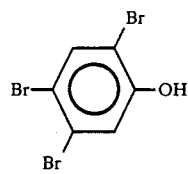
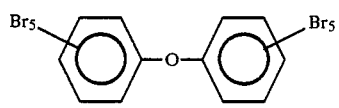

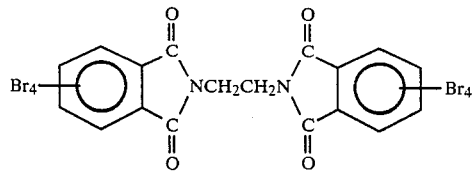
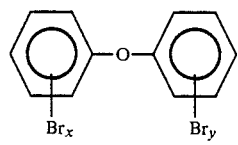
(x + y = 5-8)
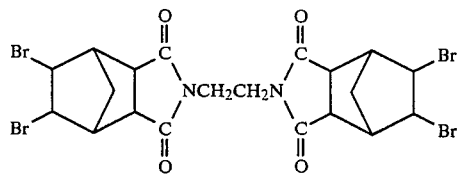
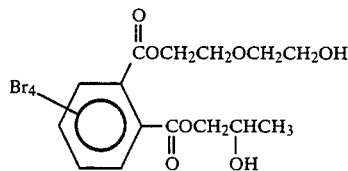
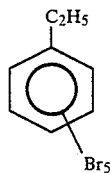
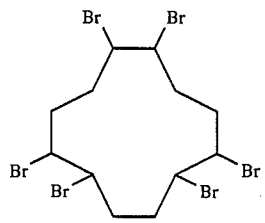
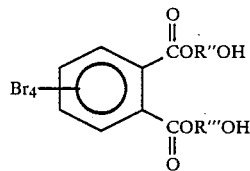
where R" and R'" are alkylene or substituted alkylene
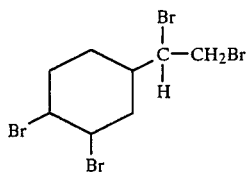
The polybutylene terephthalate resins that may be used in the present invention have the following repeated structural units of the formula:

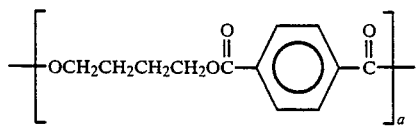

wherein a>1

The radio of tetrahalophthalate or a mixture of tetrahalophthalate and one or more brominated and/or chlorinated compounds to PBT resins that will impact flame retardancy to the latter may vary from 1:100 to about 1:2 depending on the application. In addition, the ratio of tetrahalophthalate to other brominate and/or chlorinated compounds may vary from 100:0 to about 1:9.

The compositions of this invention may also include other additives such as thermal stabilizers, ultraviolet stabilizers, reinforcing agents, organic polymers, mold release agents, blowing agents, colorants, etc.

In order to illustrate the present invention, the following examples are presented. These are not to be construed as limiting the scope of the invention.

EXAMPLE 1

To 1,392 g (3.0 moles) of tetrabromophthalic anhydride were added 1,050 g (3.0 moles) of Methoxy Carbowax 350 in the presence of 22.0 g of sodium acetate. The mixture was heated at 90° C. for 8 hours in a nitrogen atmosphere. The reaction mixture was filtered hot to remove the sodium acetate. The analytical data were consistent with the assigned structure.

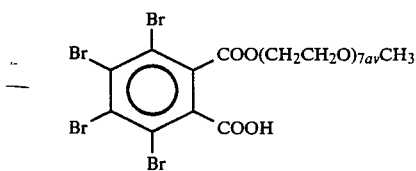

EXAMPLE 2

To the compound of Example 1 were added 348.0 g (6.0 moles) of propylene oxide and 2.0 liters of toluene. The mixture was heated at 60° C.-100° C. The solvent and residual propylene oxide were removed to give the product in almost quantitative yield. The analytical data were consistent with the assigned structure.

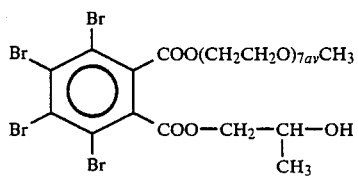

EXAMPLE 3

To 92.8 g (0.2 mole) of tetrabromophthalic anhydride is added all at once 90 g (0.2 mole) of Carbowax 400 and the mixture heated to 120°-130° C. for 2.5 hours. The desired product is isolated in essentially quantitative yield as a clear yellow viscous liquid. Calcd. Mol. Wt., 864; found 865. Calcd. % Br, 37.1; found 38.5. The analytical data are consistent with the assigned structure.

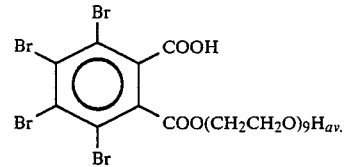

EXAMPLE 4

To 240 g (0.24 mole) of the compound of Example 3 is added 45.3 g (0.24 mole) of trimellitic anhydride and the mixture was heated at 155° C. under nitrogen for about 7 hours. The infrared spectrum indicated the completion of the reaction by the substantial disappearance of the anhydride absorption band at 5.65μ. The product was isolated in essentially quantitative yield. Analy. Calcd.; % Br, 29.4; Mol. Wt., 1,014; neutralization equivalent, 351. The spectral data was consistent with the structure.

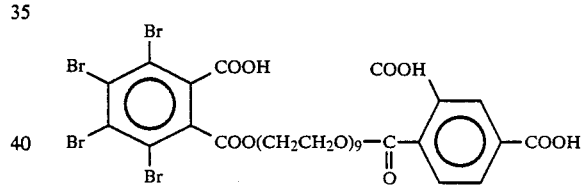

EXAMPLE 5

To 156.3 g (0.18 mole) of the compound of the Example 3 is added 70.9 g (0.18 mole) 2,3-dibromopropyl trimellitate. The mixture is heated at 130°-140° C. for 6 hours with stirring to give the product as a brown opaque oil. Isolation afforded the product in essentially quantitative yield and the analysis was consistent with the structure being:

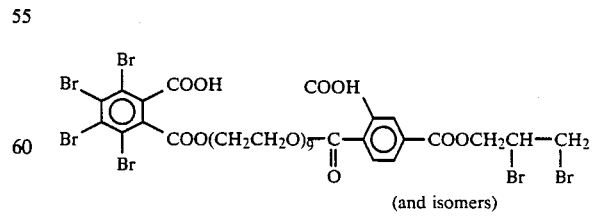

(and isomers)

EXAMPLE 6 to 11

The following preparations were carried out as in Example 3 using the reactants set forth below.

| Example No. | Tetrabromo-phthalic Anhydride | Hydroxy Compound | Product Structure |
|---|---|---|---|
| 6 | 1.0 mole | HOCH$_2$CH$_2$OCH$_2$CH$_2$OH<br>1.0 mole | Br$_4$-C$_6$-COOH, COO(CH$_2$CH$_2$O)$_2$H |
| 7 | 1.0 mole | HO(CH$_2$CH$_2$O)$_4$H<br>(Carbowax 200)<br>1.0 mole | Br$_4$-C$_6$-COOH, COO(CH$_2$CH$_2$O)$_4$H av. |
| 8 | 1.0 mole | HO(CH$_2$CH$_2$O)$_{13}$H<br>(Carbowax 600)<br>1.0 mole | Br$_4$-C$_6$-COOH, COO(CH$_2$CH$_2$O)$_{13}$H av. |
| 9 | 1.0 mole | HO(CH$_2$CH$_2$O)$_{23}$H<br>(Carbowax 1000)<br>1.0 mole | Br$_4$-C$_6$-COOH, COO(CH$_2$CH$_2$O)$_{23}$H av. |
| 10 | 1.0 mole | HO(CH$_2$CH$_2$O)$_{45}$H<br>(Polyglycol E-2000)<br>1.0 mole | Br$_4$-C$_6$-COOH, COO(CH$_2$CH$_2$O)$_{45}$H av. |
| 11 | 2.0 mole | HO(CH$_2$CH$_2$O)$_9$H<br>(Carbowax 400)<br>1.0 mole | Br$_4$-C$_6$-COOH, COO(CH$_2$CH$_2$O)$_9$—C(=O)—C$_6$-Br$_4$-COOH av. |

EXAMPLE 12

To 96.4 g (0.2 mole) of tetrabromoterphthalic acid is added all at once 160 g (0.2 mole) of Carbowax 400 and 300 g of toluene containing 1.0 g P-toluene sulfonic acid. The mixture is heated to reflux until 3.1 g (0.2 mole) water was collected. The toluene is removed under reduced pressure to give a clear viscous liquid in essentially quantitative yield.

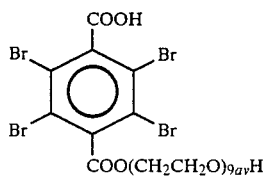

EXAMPLE 13

To 86.4 g (0.1 mole) of the compound of Example 3 is added all at once 21.8 g (0.1 mole) pyromellitic dianhydride and the mixture heated to 120°–130° C. for 2.5 hours to give the desired product. Water, 1.8 g (0.1 mole), is added to open the remaining anhydride group and the analytical data are consistent with the assigned structure.

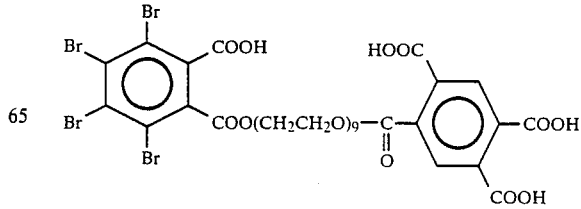

EXAMPLE 14

To 86.4 g (0.1 mole) of the compound of Example 3 is added all at once 10.9 g (0.05 mole) of pyromellitic dianhydride and the mixture heated to 120°–130° C. for 2.5 hours to give the desired product. The analytical data are consistent with the assigned structure.

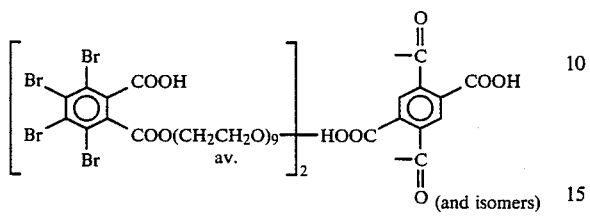

EXAMPLE 15

To 86.4 g (0.1 mole) of the compound of Example 3 is added all at once 21.8 g (0.1 mole) of phthalic anhydride and the mixture heated to 120°–130° C. for 2.5 hours to give the desired product. The analytical data are consistent with the assigned structure.

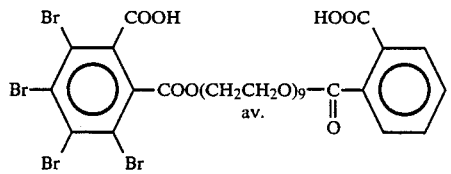

EXAMPLE 16

To 139.2 g (0.3 mole) of tetrabromophthalic anhydride is added all at once 122.9 g (0.1 mole) polyoxyethylated trimethylol propane of molecular weight 1229 and the mixture heated to 120°–130° C. for 2.5 hours to give the desired product. The analytical data are consistent with the assigned structure.

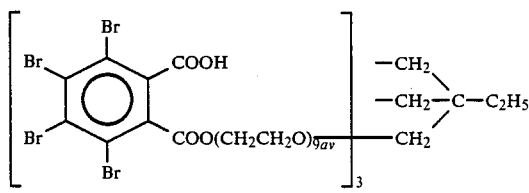

EXAMPLE 17

To 139.2 g (0.3 mole) of tetrabromophthalic anhydride is added all at once 156.8 g (0.1 mole) polyoxpropylated trimethylol propane of molecular weight 1568 and the mixture heated to 120°–130° C. for 2.5 hours to give the desired product. The analytical data are consistent with the assigned structure.

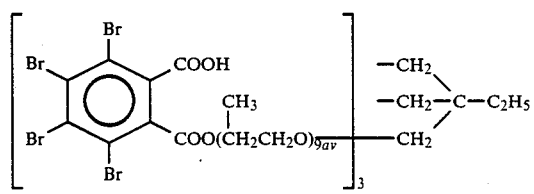

EXAMPLE 18

To 284.0 g (1.0 mole) of tetrachlorophthalic anhydride is added 350.0 g (1.0 mole) of Methoxy Carbowax 350 in presence of 7.0 g of sodium acetate. The mixture is heated at 90° C. for 8 hours in a nitrogen atmosphere. The reaction mixture is filtered hot to remove sodium acetate to give the expected product in nearly quantitative yield. The analytical data are consistent with the assigned structure.

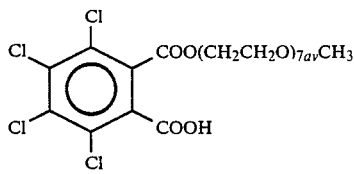

EXAMPLE 19

To 634.0 g (1.0 mole) of the composition of Example 13 is added 116 g (2.0 moles) of propylene oxide in 200 ml of toluene. The reaction mixture is heated from 60°–100° C. for 3–5 hours, and then concentrated to give the product in nearly quantitative yield. The analytical data are consistent with the assigned structure.

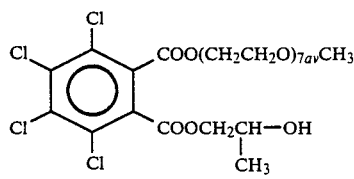

EXAMPLE 20

To 284.0 g (1.0 mole) of tetrachlorophthalic anhydride is added 200.9 g (1.0 mole) of Carbowax 200 in the presence of 7.0 g of sodium acetate. The mixture is heated at 90° C. for 8 hours in a nitrogen atmosphere. The reaction mixture is filtered hot to remove sodium acetate to generate the expected product in nearly quantitative yield. The analytical data are consistent with the assigned structure.

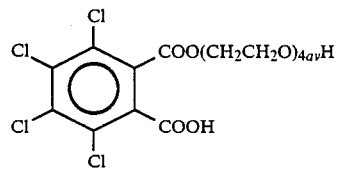

EXAMPLE 21

To 484.0 g (1.0 mole) of the product of Example 20 is added 116.0 g (2.0 moles) of propylene oxide is 200 ml of toluene. The reaction mixture is warmed at 60°–100° C. for 3–5 hours, and then concentrated to give the product in nearly quantitative yield. The analytical data are consistent with the assigned structural.

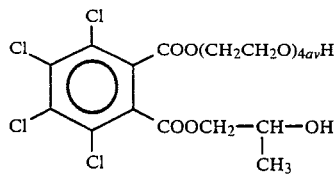

EXAMPLE 22

To 284.0 g (1.0 mole) of tetrachlorophthalic anhydride is added 400.0 g (1.0 mole) of Carbowax 400 in the presence of 7.0 g of sodium acetate. The mixture is heated at 90° C. for 8 hours in a nitrogen atmosphere. The reaction mixture is filtered hot to remove sodium acetate to generate the expected product in nearly quantitative yield. The analytical data are consistent with the assigned structure.

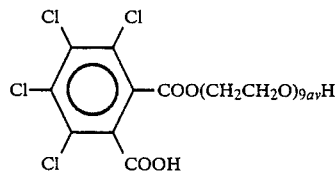

EXAMPLE 23

To 46.4 g (0.1 mole) of tetrabromophthalic anhydride is added all at once 44.1 g (0.1 mole) of polyoxyethylated dimethylamine [$(CH_3)_2N(CH_2CH_2O)_{9av}H$] dissolved in 100 ml of toluene. The mixture was heated at 100°–110° C. for 4–5 hours and then concentrated to give the desired product in essentially quantitative yield. The analytical data are consistent with the assigned structure.

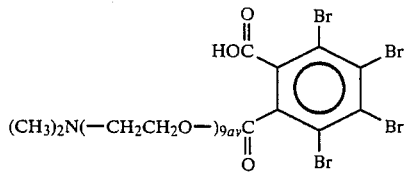

EXAMPLE 24

To 92.8 g (0.2 mole) of tetrabromophthalic anhydride is added 80.0 g (0.2 mole) of

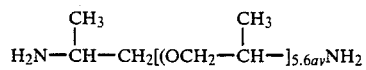

(Jeffamine D-400) and the mixture heated to about 120° C. The final product is obtained in almost quantitative yield. The analytical data are consistent with the assigned structure.

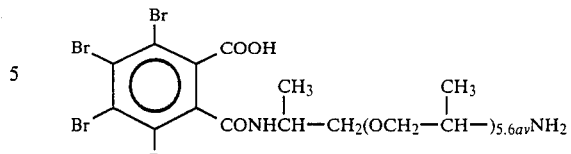

EXAMPLE 25

Poly(ethylene glycol 300), 204.5 g (0.67 mole) was refluxed (T=117° C.) with 600 ml of toluene for 1.5 hours in order to remove a small amount of water present in the glycol. The mixture was cooled to about 100° C. and tetrabromophthalic anhydride, 614.5 g (1.35 moles) and sodium acetate, 1.62 g were added and the mixture was reheated to reflux and held for 25 hours. After the mixture was cooled to 50° C., propylene oxide, (156.4 g, 2.69 moles, 100% excess) was added and the mixture heated to and held at 100° C. for 2.5 hours. When the solution cooled to about 50° C. it was filtered through a bed or diatomaceus earth and decolorizing charcoal. The filtrate was distilled to remove the solvent to give 904.1 g of product as a viscous liquid. Calcd. % Br, 47.4. Found % Br, 46.5. Analytical data is consistent with the assigned structure.

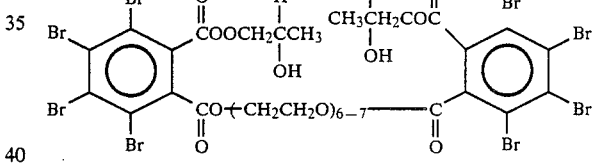

EXAMPLE 26

This compound was prepared by the procedure described in Example 25 except that poly(ethylene glycol 200) was used in place of poly(ethylene 300). Product is viscous liquid Calcd. % Br, 51.0. Found % Br, 49.3. Analytical data was consistent with the assigned structure.

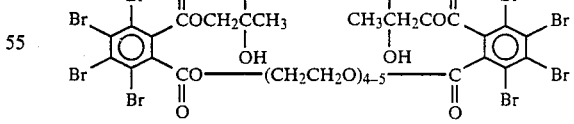

EXAMPLE 27

This compound was prepared by the procedure described in Example 25 except that poly(ethylene glycol 600) was used in place of poly(ethylene glycol 300). Product is a viscous liquid. Calcd. % Br, 39.5. Found % Br, 39.3. Analytical data is consistent with the assigned structure.

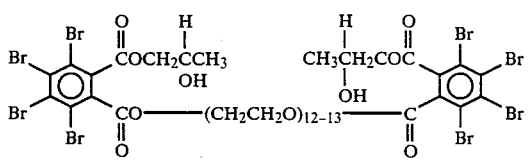

EXAMPLE 28

This compound was prepared by the procedure described in Example 25 except that poly(ethylene glycol 400) was used in place of poly(ethylene glycol 300). Product is a viscous liquid. Calcd. % Br, 44.2. Found % Br, 44.0. Analytical data is consistent with the assigned structure.

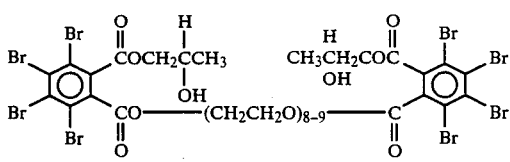

EXAMPLE 29

Methanol (54.1 g, 1.5 mole), tetrabromophthalic anhydride (695.6 g, 1.6 moles), and potassium acetate, 2.73 g were refluxed for 4 hours with 500 ml of toluene. After cooling the reaction mixture to room temperature, propylene oxide (87.12 g, 1.5 moles) were added and the mixture reacted at 80° C. for 2.5 hours. Product was obtained as a viscous liquid after distilling out the toluene. Calcd. % Br, 57.7. Found % Br, 57.2. Analytical data is consistent with assigned structure.

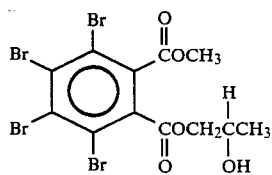

EXAMPLE 30

This compound was prepared by the procedure similar to that described in Example 29 except that methoxycarbowax 350 was used in place of methanol and ethylene oxide in place of propylene oxide. Calcd. % Br, 37.8. Found % Br, 37.2. Analytical data is consistent with assigned structure.

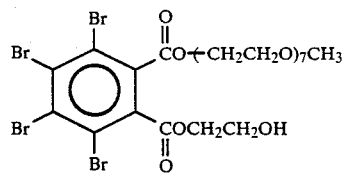

EXAMPLE 31

This compound was prepared by the procedure in Example 29 except that 2-methoxyethanol is used in place of methanol. Product is viscous liquid. Calcd. % Br, 53.6. Found % Br, 52.0. Analytical data is consistent with the assigned structure.

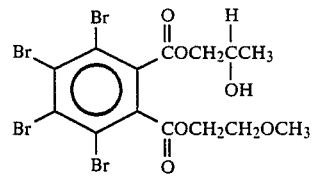

EXAMPLE 32

This compound was prepared by the procedure outlined in Example 29 except that methoxycarbowax 350 was used in place of methanol and epoxybutane in place of propylene oxide. Product is a viscous liquid. Calcd. % Br, 36.5. Found % Br, 37.2. Analytical data is consistent with the assigned structure.

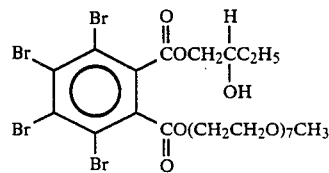

EXAMPLE 33

This compound was prepared by the procedure outlined in Example 29 except that 2-ethylhexanol-1 was used in place of methanol. Product is a viscous liquid. Calcd. % Br, 50.0. Found % 52.7. Analytical data is consistent with the assigned structure.

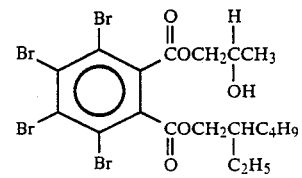

EXAMPLE 34

This compound was prepared by the procedure described in Example 29 except that stearyl alcohol was used in place of methanol. Product is a viscous liquid. Calcd. % Br, 41.0. Found % Br, 43.0. Analytical data is consistent with the assigned structure.

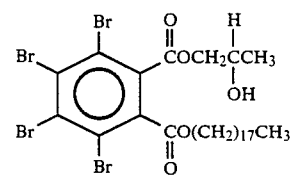

EXAMPLE 35

This compound was prepared by the procedure described in Example 29 except that 2,3-dibromopropanol-1 was used in place of methanol. Product is a viscous liquid. Calcd. % Br, 64.8. Found % Br, 61.9. Analytical data is consistent with the assigned structure.

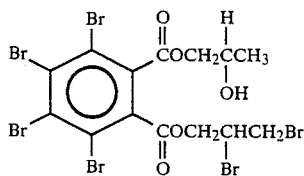

EXAMPLE 36

This compound was prepared by the procedure outlined in Example 29 except that epichlorohydrin was used in place of propylene oxide. Calcd. % Br, 35.7. Found % 35.4. Analytical data is consistent with the assigned structure.

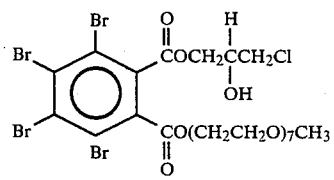

EXAMPLE 37

To a solution of methoxycarbowax 350 (300.0 g, 0.89 mole) in dry toluene (184 ml) was added sodium methoxide (48.0 g, 0.90 mole) in methanol. The methanol was then distilled off atmospherically. Tetrabromophthalic anhydride was then added (442.2 g, 0.89 mole) along with an additional 50 ml of toluene. The reaction mixture was refluxed for 2 hours and after cooling to room temperature, epichlorohydrin (106.94 g, 1.16 moles) was added. The mixture was refluxed for 20 hours. After the solvent and excess epichlorohydrin were distilled, a viscous dark product was obtained. Calcd. % Br, 37.2. Found % Br, 40.4. Analytical data is consistent with assigned structure.

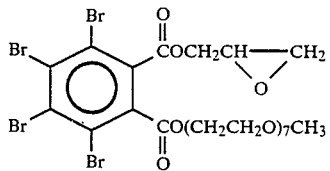

EXAMPLE 38

Methoxycarbowax 350 and toluene were refluxed for 1 hour in order to distill out a small amount of water. Tetrabromophthalic anhydride (1:1 mole ratio with methoxycarbowax 350) and sodium acetate were added and the mixture refluxed for 17 hours. After cooling to room temperature, an excess of diazomethane (prepared from the decomposition of N-methyl-N-nitroso-p-toluene sulfonamide by sodium hydroxide) in ethyl ether was added and the mixture allowed to stand overnight. The excess diazomethane was decomposed by adding acetic acid and the solvent removed by distillation. Product is viscous liquid. Calcd. % Br, 39.2. Found % Br, 37.4. Analytical data is consistent with the assigned structure.

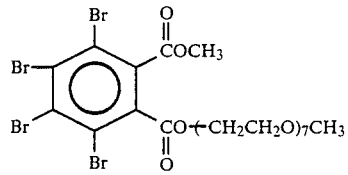

EXAMPLE 39

Di(2-ethylhexyl) tetrabromophthalate was prepared by the procedure described by Spatz et. al (I & EC Product Research and Development, Vol. 8, No. 4, 395 (1969).

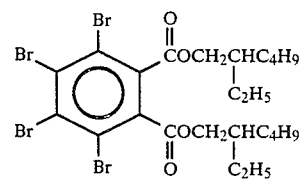

EXAMPLE 40

Poly(ethylene glycol 600) 885.4 g (1.40 moles), tetrabromophthalic anhydride, 1298.4 g (2.80 moles), potassium acetate, 1.35 g, and toluene (1000 g) were charged into a one-gallon glass-lined reactor and heated to 120° C. After 4 hours at this temperature, ethylene oxide, 246.68 g (5.60 moles) was pumped into the reactor in ¾ hour while maintaining the temperature at 120° C. After one hour longer of heating, the mixture was cooled to room temperature, the excess ethylene oxide was then vented, and the product collected. After stripping off the toluene, 2250 g of the product was isolated in 99% yield as a viscous liquid. Calcd. % Br, 39.2. Found % Br, 38.8. Analytical data is consistent with the assigned structure.

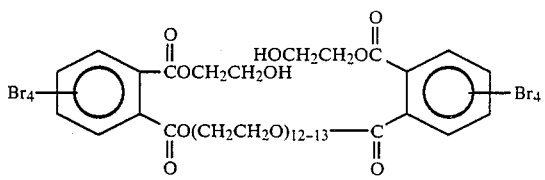

EXAMPLE 41

To the product of Example 3, 453.8 g (0.27 mole), acetic anhydride, 83.4 g (0.82 mole), potassium acetate, 1.0 g, and toluene, 400 ml, were refluxed for 8 hours. After cooling to room temperature, the reaction mixture was transferred to a separatory funnel and extracted first with 100 ml of a 16% potassium bicarbonate solution and then with 100 ml of water. After distilling off the solvent, 335.0 g (64% yield) of product was obtained as a viscous liquid. Calcd. % Br, 36.8. Found % Br, 32.9. Analytical data is consistent with the assigned structure.

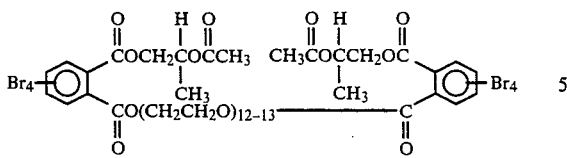

EXAMPLE 42

Tetrabromophthalic anhydride, 231.9 g (0.50 mole), 2-ethylhexanol, 130.2 g (1.0 mole), and potassium acetate, 0.24 g were heated to and kept at 120° C. for 4 hours. The mixture was cooled to 60° C. and potassium carbonate, 35.9 g (0.26 mole), was added. Reheated mixture to 80° C. and kept it at this temperature for 2 hours. Cooled mixture to 60° C. and added triethylamine, 14.2 g (0.14 mole). Reheated mixture to 70° C. and added methyl iodide, 113.6 g (0.8 mole) in 20 minutes. Heated mixture to 70°–75° C. and kept it at this temperature for 2½ hours. Cooled mixture to room temperature and filtered it in order to remove by-product potassium iodide. The filtrate was distilled to remove toluene and 290 g of crude product was collected as a pale yellow liquid. Extracted this product with 3 times 100 ml of a 6.5% potassium carbonate solution followed by 2 times 100 ml of water and once with a 30% sodium chloride solution. Dried the organic phase over anhydrous magnesium sulfate overnight. Filtered off magnesium sulfate and after removing the solvent from filtrate by distillation, 204 g of product was obtained in 67% yield as a pale yellow liquid. Calcd. % Br, 52.6. Found % Br, 52.2. Analytical data is consistent with the assigned structure.

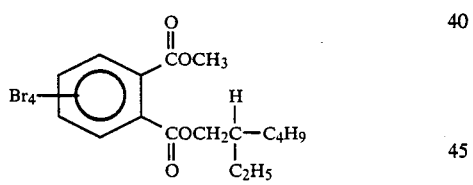

EXAMPLE 43

Tetrabromophthalic anhydride, 231.9 g (0.5 mole), 2-[2-methoxyethoxy]-ethanol, 360.5 g (3.0 moles), stannous oxalate, 2.32 g, and xylene, 200 ml, were refluxed (temp. 160° C.) for 18 hours during which time, theory water was collected. The xylene and excess 2-[2-methoxyethoxy]-ethanol were distilled under reduced pressure to give 332 g of crude product as a wet white solid. Redissolved 256 g of this material in toluene (1000 ml) and extracted it with 3 times 200 ml of a 7.5% potassium bicarbonate solution followed by one extraction with 200 ml of water. Dried the organic phase with anhydrous magnesium sulfate overnight. After removing the magnesium sulfate by filtratin, toluene was removed by distillation to give 45 g of a yellow liquid product. Overall yield is 17%. Calcd. % Br, 46.6. Found % Br, 45.7. Analytical data is consistent with the assigned structure.

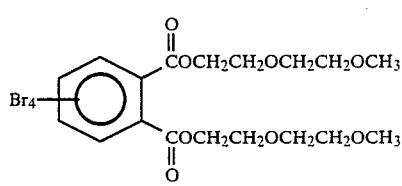

EXAMPLE 44

This compound was prepared by the procedure outlined in Example 43 except that 2-[2-methoxyethoxy]-ethanol.

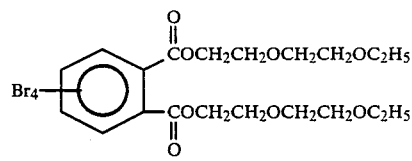

EXAMPLE 45

This compound was prepared by the procedure outlined in Example 1 except that docosyl alcohol (behenyl alcohol) was used in place of poly(ethylene glycol 600) and propylene oxide in place of ethylene oxide. Product is a viscous liquid. Calcd. % Br, 37.7. Found % Br, 36.5. Analytical data is consistent with the assigned structure.

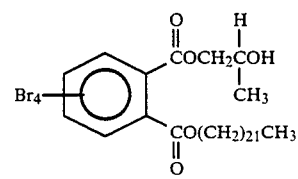

EXAMPLE 46

This compound was prepared by the procedure outlined in Example 1 except that tricontyl alcohol was used in place of poly(ethylene glycol 600) and propylene oxide in place of ethylene oxide. Product is a viscous liquid.

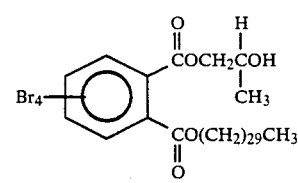

EXAMPLE 47

This compound was prepared by the procedure outlined in Example 4 except that methoxycarbowax 550 was used in place of 2-[2-methoxyethoxy]-ethanol.

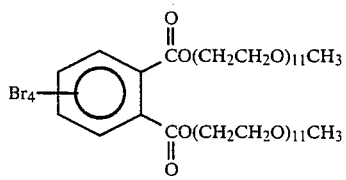

EXAMPLES 48-51

In the following examples, the flame retardancy of the compounds of this invention are demonstrated. The compositions were prepared by mixing together the flame retardants, antimony oxide, and PBT on a roller until the compounds were blended thoroughly. The compounds were pelletized at 150°-216° C. and then injection molded into test specimens at 235° C. The UL-94 vertical burn test was run and compared to a control consisting of PBT itself. Melt flow of the various materials were determined according to ASTM D-1238.

PBT=Polybutylene Terephthalate
BPC=Brominated Polycarbonate Oligomer (58% Bromine)
DOTBP=Dioctyl Tetrabromophthalate (45% Bromine)
AO=Antimony Oxide

TABLE I

| Example No | 48 | 49 | 50 | 51 |
|---|---|---|---|---|
| PBT[a] | 100.0 | 85.0 | 82.8 | 80.7 |
| BPC | — | 15.0 | 7.5 | — |
| DOTBP | — | — | 9.7 | 19.3 |
| Antimony Oxide | — | 5.0 | 5.0 | 5.0 |
| UL-94 Rating | | | | |
| @ 0.125" | V-2 | V-0 | V-0 | V-0 |
| @ 0.063" | V-2 | V-0 | V-0 | V-0 |
| Melt Flow (g/10 min) | 27.6 | 36.2 | 55.1 | 72.6 |

[a]Hoechst-Celanex ® 2000

The above clearly demonstrates the flame retardancy of the compositions of this invention relative to the control. These compositions have at least equivalent flame retardancy to the conventional flame retardant used in PBT (BPC).

Examples 49-51 are all run at equal bromine levels. Partial or total replacement of the conventional flame retardant (BPC) with the compositions of this invention results in enhanced flow characteristics as shown by the improved melt flow properties measured according to ASTM D-1238.

EXAMPLES 52-54

The following tests were performed on the various materials according to the appropriate ASTM method.
1. Impact Strength—ASTM D-256
2. Tensile Strength—ASTM D-638
3. Heat Deflection Temperature (HDT)—ASTM D-648
4. Melt Flow—ASTM D-1238

TABLE II

| Example No | 52 | 53 | 54 |
|---|---|---|---|
| PBT[a] | 100 | 85.0 | 83.8 |
| BPC | — | 15.0 | 11.3 |
| DOTBP | — | — | 4.9 |
| Antimony Oxide | — | 5.0 | 5.0 |
| LOI | 25 | 32 | 32 |
| UL-94 Rating | | | |
| @ 0.125 | V-2 | V-0 | V-0 |
| @ 0.063 | V-2 | V-0 | V-0 |
| Notched Izod (lbs/inch) | 0.45 | 0.33 | 0.60 |
| Tensile Strength (PSI) | 7320 | 8040 | 7750 |
| % Elongation | 10.9 | 10.3 | 11.8 |
| HDT (°F.) | 127 | 149 | 135 |
| Melt Flow (g/10 min) | 27.6 | 36.2 | 61.9 |

[a]Hoechst-Celanese's Celanex ® 2000

As can be seen from the data above, compositions containing the flame retardants of this invention greatly improve the impact strength relative to the control and the conventional flame retardant, BPC, used in PBT while maintaining both tensile strength and percent elongation properties.

In addition, the flame retardants of this invention significantly improve the heat distortion temperature (HDT) and flow properties relative to the control.

The data above clearly demonstrates the improved processability of the compositions containing the materials of this invention.

We claim:

1. A uniform flame retardant molding composition comprising:

(i) a polybutlyene terephthalate resin having the following repeated structural units:

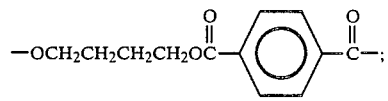

(ii) a flame retarding effective amount of a tetrahalophthalate ester flame retardant processing aid of the formula:

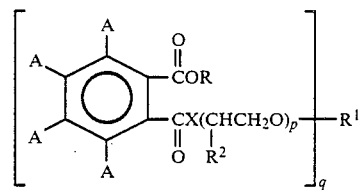

wherein
(a) R is selected from the group consisting of hydrogen, an alkyl or substituted alkyl of 1 to 30 carbons, and

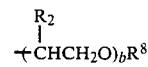

where $R^8$ is an alkyl or substituted alkyl of 1 to 18 carbons, and b is 1 to 50;
(b) $R^1$ is selected from the group consisting of an alkyl or substituted alkyl of 1 to 30 carbons, alkenyl or substituted alkenyl of 2 to 22 carbons,

where R⁷ is an alkyl of 1 to 18 carbons;

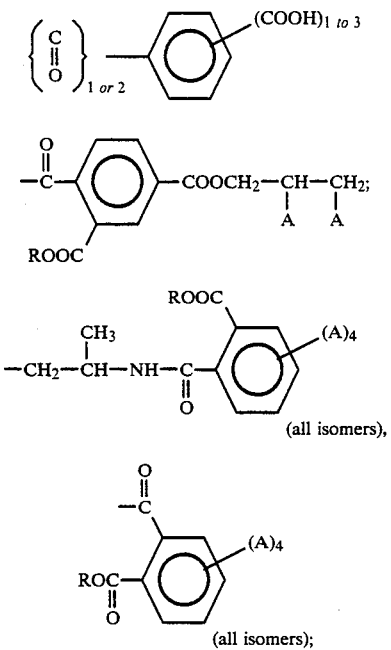

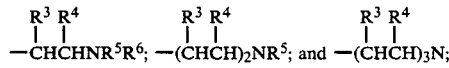

with the proviso that the valence of R¹ is equal to q;

(c) R² is independently selected from the group consisting of H and CH₃;

(d) R³, R⁴, R⁵, and R⁶ are independently selected from the group consisting of H and an alkyl of 1 to 18 carbons;
(e) p is an integer of 0 to 50;
(f) q is an integer of 1 to 6;
(g) X is selected from the group consisting of O or NH;
(h) A is selected from the group consisting of Cl or Br; and
(i) provided further that when p is zero and X is oxygen that R and R¹ are other than a neopentyl group.

2. The composition of claim 1 wherein p is zero, and q is one and X is oxygen.

3. The composition of claim 2 wherein R and R¹ are alkyl groups and A is Br.

4. The composition of claim 3, di-2-ethylhexyl tetrabromophthalate.

5. The composition of claim 1 wherein the weight ratio of (i) to (ii) is within the range of about 100:1 to about 2:1.

6. The composition of claim 1 wherein said tetrahalophthalate ester of (ii) R is an alkyl or substituted alkyl of 1 to 10 carbons, A is Br, X is oxygen, p is 0 to 20, and q is 1 to 6.

7. The composition of claim 6 wherein R is selected from the group consisting of

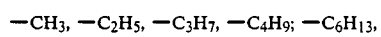
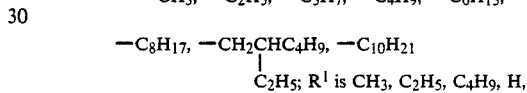
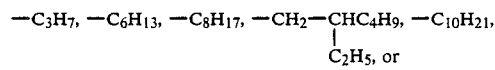

and q=1.

8. The composition of any one of claims 1, 2, 3, 4, 5, 6, or 7 wherein (ii) includes other brominated or chlorinated flame retardants or mixtures thereof.

9. The composition of claim 8 wherein said brominated flame retardants are selected from the group consisting essentially of

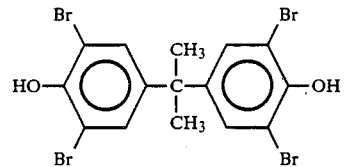

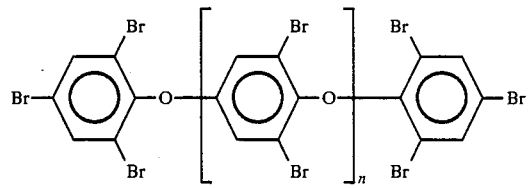

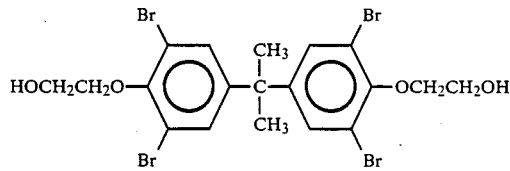

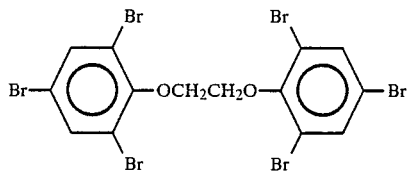
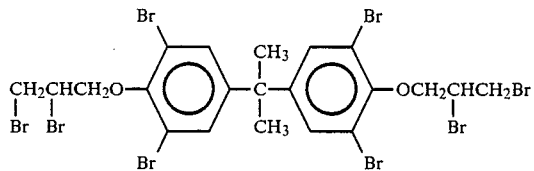
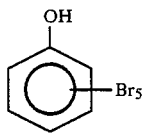
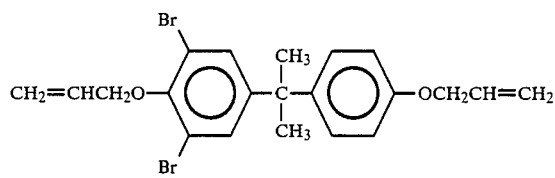
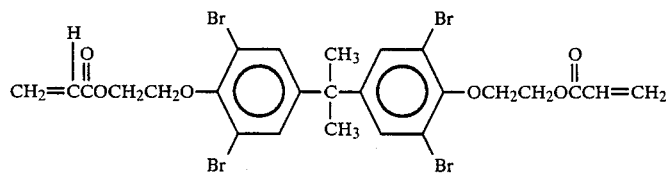
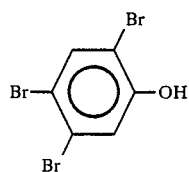
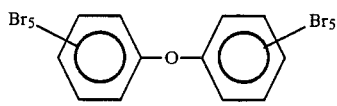
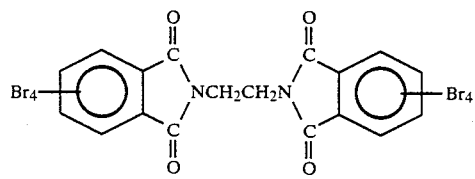
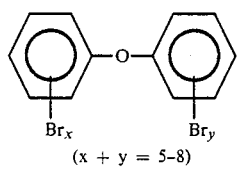
(x + y = 5-8)

-continued

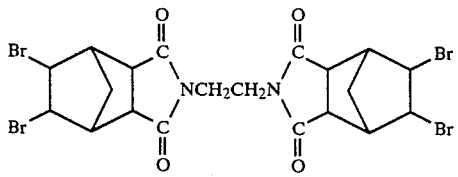

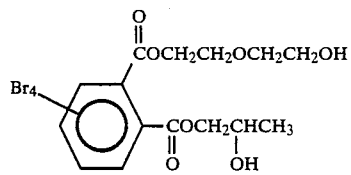

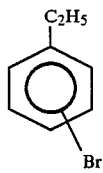

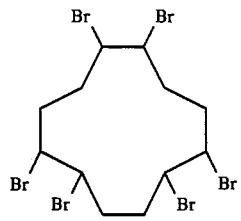

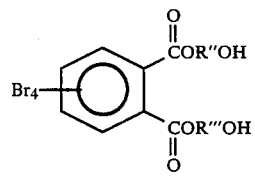

where R" and R''' are alkylene or substituted alkylene

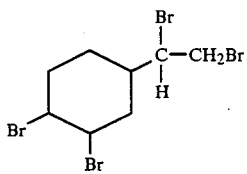

10. A method for preparing a uniform flame retardant molding composition having enhanced processability properties which comprises incorporating a flame retarding effective amount of the tetrahalophthalate ester of claim 1 (ii) in the polybutylene terephthalate resin.

11. The method of claim 10 wherein the weight ratio of polybutylene terephthalate resin to the tetrahalophthalate ester is within the range of 100:1 to about 2:1.

12. The method of claim 10 wherein in said tetrahalophthalate ester of claim 1 (ii) R is an alkyl or substituted alkyl of 1 to 10 carbons, A is Br, X is oxygen, p is 0 to 20, and q is 1 to 6.

13. The method of claim 10 wherein in said tetrahalophthalate ester of claim 1 (ii) p is zero, and q is one and X is oxygen.

14. The method of claim 10 wherein in said tetrahalophthalate ester of claim 1 (ii) R and $R^1$ are alkyl groups and A is Br.

15. The method of claim 10 wherein said ester is di-2-ethylhexyltetrabromophthalate.

16. The method of claim 12 wherein R is selected from the group consisting of $-CH_3$, $-C_2H_5$, $-C_3H_7$, $-C_4H_9$; $-C_6H_{13}$, $-C_8H_{17}$, $-CH_2CHC_4H_9$, $-C_{10}H_{21}$
      |
      $C_2H_5$; $R^1$ is $CH_3$, $C_2H_5$, $C_4H_9$, H, $-C_3H_7$, $-C_6H_{13}$, $-C_8H_{17}$, $-CH_2-CHC_4H_9$, $-C_{10}H_{21}$,
                                      |
                                      $C_2H_5$, and q=1.

17. The method of claim 10 wherein the resin includes other brominated or chlorinated flame retardants or mixtures thereof.

18. The method of claim 17 wherein said brominated flame retardants are selected from the group consisting essentially of

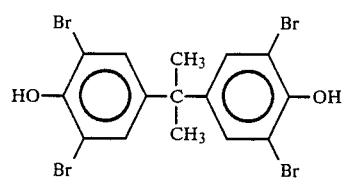
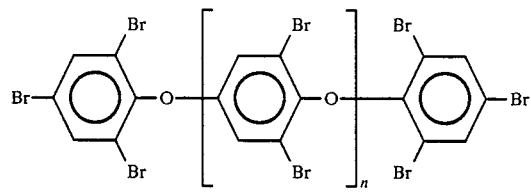
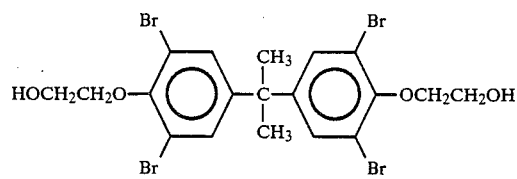
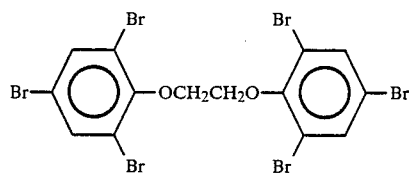
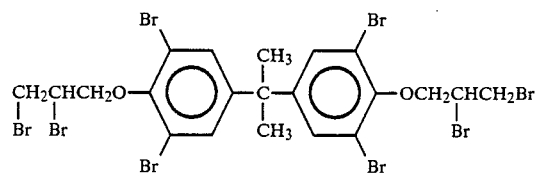
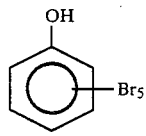
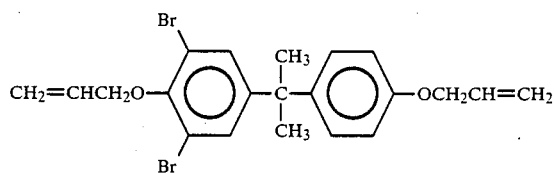
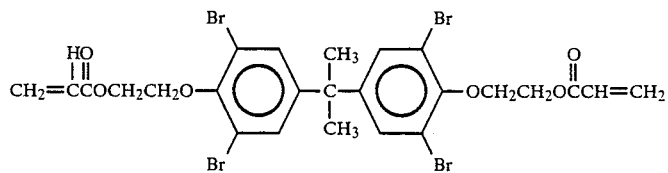
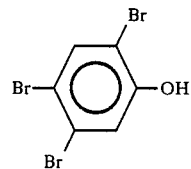

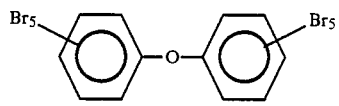
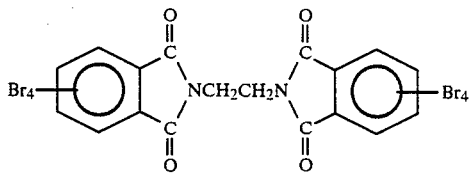
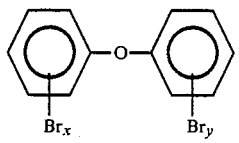
(x + y = 5-8)
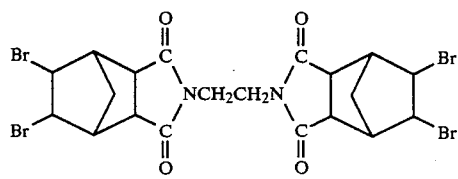
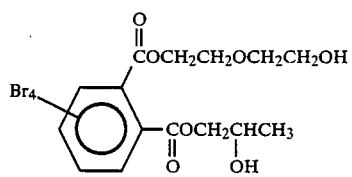
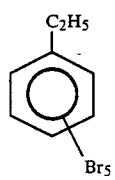
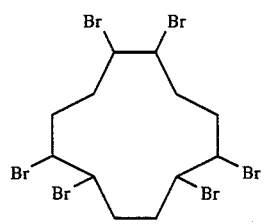
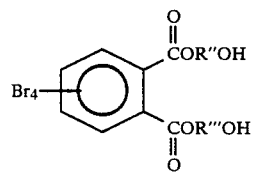
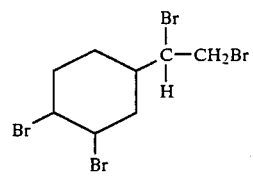
where R″ and R‴ are alkylene or substituted alkylene, and
* * * * *